Nov. 21, 1950   W. BROWN   2,530,646
EPICYCLIC VARIABLE SPEED GEARING
Filed June 20, 1947   3 Sheets-Sheet 1

INVENTOR
WILLIAM BROWN
BY

Nov. 21, 1950 W. BROWN 2,530,646
EPICYCLIC VARIABLE SPEED GEARING
Filed June 20, 1947 3 Sheets-Sheet 2

INVENTOR
WILLIAM BROWN
BY

Patented Nov. 21, 1950

2,530,646

UNITED STATES PATENT OFFICE 2,530,646

EPICYCLIC VARIABLE-SPEED GEARING

William Brown, Nottingham, England

Application June 20, 1947, Serial No. 756,077
In Great Britain October 7, 1938

Section 1, Public Law 690, August 8, 1946
Patent expires October 7, 1958

6 Claims. (Cl. 74—763)

This invention relates to epicyclic variable speed gearing and is a development of the invention described in the specification of my copending United States Patent No. 2,168,600. It embodies a very similar arrangement of gearing and selector mechanism and in much the same way provides close-ratio gearing, but it also embodies one, two or more additional ratios without additional gearing and provides also new characteristics and advantages.

The invention in effect relates to gearing of the kind in which there are two adjacent epicyclic trains of gearing A and B coupled for differential action and wherein, for one position at least of the selector mechanism the parts of the two trains are coupled together, so that, as in the earlier aforesaid invention, the planet carrier and annulus of the train A are connected respectively to the sun pinion and planet carrier of the other train B for rotation together, leaving the solitary sun pinion of the train A and the solitary annulus of the train B.

One object of the invention has been to provide one or two additional ratios with a larger gear ratio and another object has been not only to retain the low gear ratio feature of the earlier aforesaid invention, but also to provide that the difference between the two low ratio changes (i. e. between the three low gear ratios) shall be such that the percentage decrease is greater than the percentage increase estimated from the middle gear ratio, which result is opposite to that provided by the earlier invention. The advantage of this opposite result is easily appreciated by the cyclist.

According to the invention the improved gear comprises two epicyclic gear trains and means for coupling the parts of the two said epicyclic gear trains together for differential action and to driving, driven and stationary members and is characterised in that the annulus of the second train is permanently coupled to the driven member and means are provided (a) for coupling alternatively the planet carrier or annulus of the first train to the driven member, (b) for coupling alternatively the sun of the second train or of the first train to the axle for holding it stationary, and (c) for coupling a driving member alternatively to either the planet carrier or annulus of the first train, so that for one increase and one decrease differential ratio from direct drive the gear ratio increase is less than the gear ratio decrease.

According to a second feature of the invention, means are provided for coupling the driving, driven and stationary members to the parts of one of the epicyclic gear trains so as to obtain one or two normal or direct gear ratios therefrom.

According to a third feature of the invention whilst the selector mechanism is positioned for use of one only of the epicyclic gear trains for a normal or direct gear ratio, the planet carrier of the other train is released.

According to a preferred embodiment incorporating the second feature of the invention, the selector mechanism is arranged so that for a 4-speed gear whilst the sun pinion of the train A is held stationary and the planet carrier of the train B is uncoupled from the driven member (the annulus of the train B being coupled to the driven member) the driving member may be coupled alternatively to the annulus of the train B for a normal or direct ratio, or to the planet carrier of the train B for a low ratio high gear, or whilst the driving member is connected to the annulus of the train B, the latter is uncoupled from the driven member (the planet carrier of the train B being then coupled to the driven member) for a low ratio low gear, or whilst the driving member is still coupled to the annulus of the train B and the planet carrier of the train B is still coupled to the driven member, the sun of the train A is released and the sun of the train B is held stationary for a fourth or low gear of larger ratio: Or, for a fifth and high gear ratio; the selector mechanism is arranged for the sun of the train A to be held stationary whilst the driving member is connected to the planet carrier of the train B and the annulus of the train B is connected to the driven member.

In the case of the 4-speed gear it is possible to provide selection by a single control but in the case of the 5-speed gear the preferred arrangement comprises two separate controls, one for the movement of the driving selector, and the other for alternative holding of one or other of the suns to the axle shaft. By such arrangement, one lever will provide high, normal and low ratios whilst the other lever will decide whether the high and low ratios are small or large. Other combinations of the coupling mechanisms may be provided as alternative to some of the combinations above described, that is to say, giving the same gear ratios, but with different couplings, without departing from the nature of the invention.

Figure 7:
Fig. 7 is a longitudinal section showing a modified arrangement of the selector control within the axle.

As illustrated in Figs. 1 to 6, the improved gear is constructed as a four speed cycle hub giving three close ratios suitable for racing purposes, together with a fourth lower gear ratio, whilst Fig. 7 provides a fifth higher ratio. The gear, will, of course, have many other uses, but it is particularly designed and intended for such aforementioned use.

Figure 1:
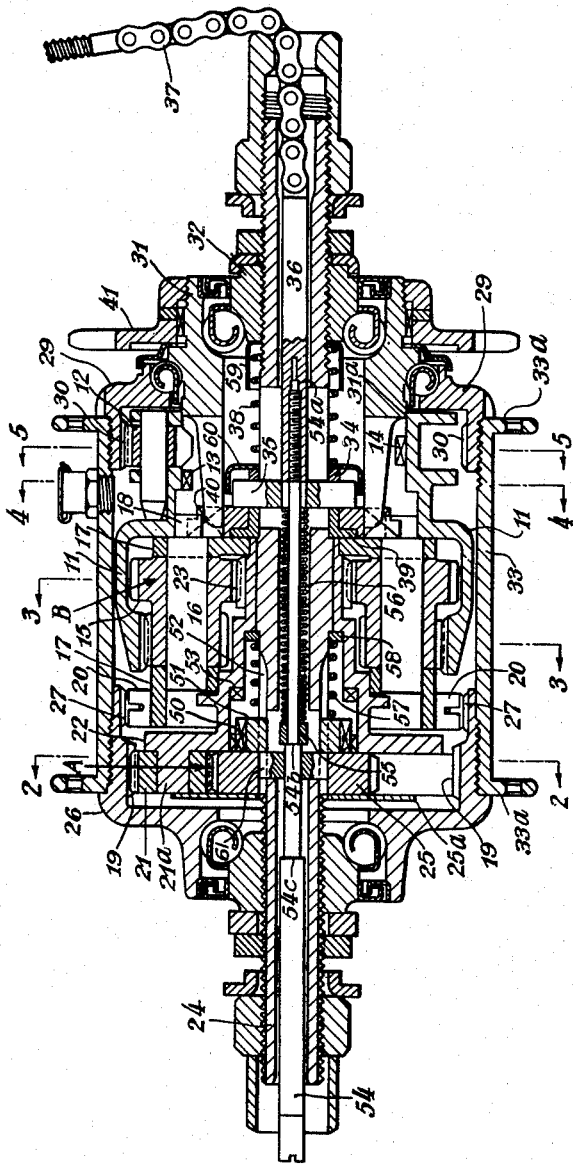
Fig. 1 is a sectional side elevation of a cycle hub incorporating one example of speed gear made in accordance with the invention, but in which some of the sections are displaced angularly for the sake of clearance.
Figure 3:
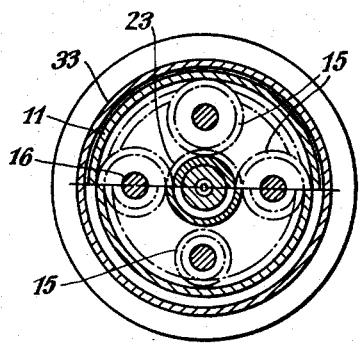
Fig. 3 is a cross section on line 3—3 of Fig. 1, showing the gear train B.
Figure 4:
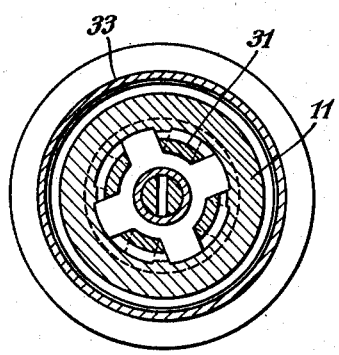
Fig. 4 is a cross section on line 4—4 of Fig. 1, showing the dog clutch drive to the gear train B.
Figure 5:
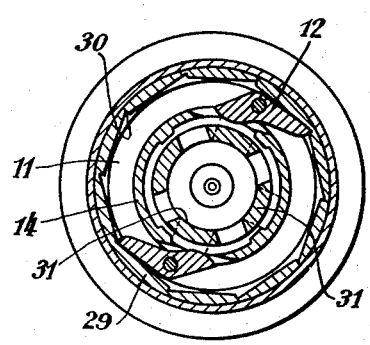
Fig. 5 is a cross section on line 5—5 of Fig. 1, showing the pawl drive from the annulus of the gear train B to the hub body.
Figure 6:
Fig. 6 is a perspective view of the pawl showing the side bevel or chamfer on one end, the purpose of which is described later.

As shown in Fig. 1, the epicyclic gear train B consists of the annular gear ring or solitary annulus 11 extended at one end to carry driving pawls 12 and having on its inner bore two sets of splines 13 and 14, in separate planes for alternative selection (see also Figs. 4 and 5). The splines 13 and 14 are parallel and concentric to the axis of the gear ring but the two sets of splines are displaced angularly from each other so that the splines 14 lie between the splines 13 when viewed from the end. Meshing with the said annular gear ring 11 are double planet pinions 15 carried on pins 16 which are extended through bearings in a planet cage 17 to form driving dogs 18, adjacent to and in a separate plane from the aforesaid sets of splines. This planet cage 17 carries driving pawls 20. The annular gear ring 19, of the gear train A is formed in the end piece 26 of the hub shell and meshing therewith are planet pinions 21 journalled on pins 21a mounted in a planet cage 22. This planet cage 22 has formed on it, or attached to it, a pinion 23, which meshes with the planet pinions 15 so completing the epicyclic gear train B (see Fig. 3).

Figure 2:
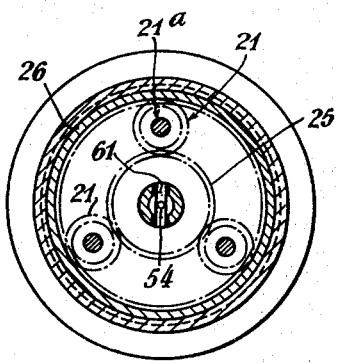
Fig. 2 is a cross section on line 2—2 of Fig. 1, showing the gear train A.

Concentric with the foregoing parts lies an axle 24 on which is rotatably mounted a pinion 25 which meshes with the planet pinions 21 so forming the solitary sun pinion and completing the epicyclic gear train A (see Fig. 2). The sun pinion 25 carries on its face dogs 50. The axle 24 has splines 52 formed in it, upon which splines is keyed a sliding dog 51 which can engage with the dogs 50 when required, so locking the pinion 25 to the axle, or freeing it at will.

Further, the planet cage 22 has formed in its bore a set of dogs 53 which can also be engaged by the sliding dog 51 so locking planet cage and pinion 22 to the axle or freeing it at will. A key 61 is provided passing through a slot in the axle 24 and located behind the sliding dog 51 and itself adapted to be engaged by a shoulder 54c for movement of the sliding dog, as described later.

Additional to key 35, rod 36, and chain 37 (as described later) is a further rod 54 screwed into rod 36 and carrying three shoulders or stops 54a, 54b and 54c. The end shoulder 54a butts within the rod 36 when screwed home, and a collar 55 butts against shoulder 54b. Between the collar 55 and key 35 is a spring 56, such spring being stronger in its partly compressed position than the spring 38 in its fully compressed position. The end of the rod 36 locates the key 35 relative to the shoulders 54b and 54c. A further spring 57 acting against a collar 58 which rests against a shoulder on the axle 24 keeps the sliding dog 51 normally in engagement with the dogs 50 on the sun pinion 25 so locking it to the axle. The planet cage 22 is journalled into both ends of the planet cage 17 and also onto the pinion 25, so making the assembly a concentric one with itself and with the axle 24 and providing good bearing surfaces. The piece 26 also supports the planet cage 17 by being journalled over the seating diameter of the pawls 20.

Further, the gear ring 11 is centralised by the extensions 18 on the planet pinion pins 16 engaging with its bore. The drive is taken from the left hand end of the gear by the driving pawls 20 to a supporting piece 26 which carries ratchet teeth 27 operating in a forward direction. This supporting piece 26 is mounted on ball bearings to a cone 28 screwed to the axle. The drive is taken from the other end of the gear by the pawls 12 to another supporting piece 29 which carries ratchet teeth 30 also operating in a forward direction (see also Fig. 5). Carried in a ball journal in this supporting piece 29 is the driving member 31 which is further supported by a ball journal on a cone 32 screwed to the axle 24. An extension of the driving member 31 through the supporting piece 29 is journalled into the gear ring 11 so keeping it concentric with the axis of the whole assembly. Between and fixed to the two end supporting pieces 26 and 29 is mounted a shell 33 which performs the several functions of spacing the supporting pieces 26 and 29, forming a casing for the whole mechanism, and forming fixing flanges 33a for building a cycle wheel by means of spokes in the usual manner.

Also, on the axle 24 is slidably mounted a sleeve 34 operable by a key 35, rod 36 and chain 37 in known manner. A spring 38 acting between the sleeve 34 and the adjacent cone 32 is used to move the sleeve 34 to the left and movement in the other direction is obtained by a pull applied to the said chain 37. Between the ends of the spring 38 and the cone 32 is a sleeve 59 whilst between the other end of the spring 38 and the sleeve 34 is a cap 60. Rotatably mounted on the sleeve 34 and laterally positioned by a collar 39 formed on the sleeve and the said key 35, is a sliding dog 40 which engages with the driving member 31 for rotation with it, while still free to be moved laterally by the sleeve 34 and key 35. Also mounted on the driving member 31 in the application of the gear to a cycle hub, is a chain sprocket 41, the mounting being by splines in the example described, so that power can be transmitted to the driving member 31 by means of a chain from the usual bracket chain-wheel (not shown).

In the normal position the combined spring effect is therefore, to engage the dog 51 with the pinion 25 so locking it to the axle, and the dog 40 with the driving dogs 18 so coupling the driving member 31 to the planet carrier 17. The dog clutch 40 can be moved to the right by pulling on the chain 37 so that it can engage with the splines 13, such movement being possible since the spring 56 is stronger than the spring 38. Further pulling on the chain 37 will next cause the dog 40 to engage with the splines 14. At this point the cap 60 against the sleeve 34 will come into contact with the sleeve 59 against the cone 32 and prevent any further movement to the right of the dog 40. At this point the shoulder 54c on the rod 54 will also butt against the key 61, so that by further pulling on the chain 37, the spring 56 will be compressed, pulling key 61 to the right and with it the dog 51. The dog 51 will, therefore, move out of engagement with the dogs 50 on the pinion 25 and into engagement with the dogs 53 on the combined planet carrier and sun pinion 22, 23, whilst still leaving the dog 40 engaged with the splines 14 of the solitary annulus 11, so giving gear ratios as described hereunder.

The complete epicyclic gear train is such that if a turning effort be applied to the driving dogs 18 on the planet carrier 17 the gear ring 11 will be carried round in the same direction at an increased speed, such speed being governed by the numbers of teeth in the gear ring 11 and sun pinion 23, and also by the fact that this sun pinion 23 is rotated in the same direction by action of the gear ring 19 (which in this gear is attached to and rotates at the same speed as the gear ring 11 by virtue of the pawls 12, supporting piece 29, shell 33, and supporting piece 26) acting on the planet cage 22 by means of the planet pinions 21 which mesh with gear ring 19 and sun pinion 25, which latter is fixed to the axle 24, which is held in a non-rotatable manner in the cycle frame in this instance. Since the supporting piece 26 rotates faster than the planet carrier 17, the ratchet teeth 27 overrun the pawls 20 and there is no connection therefore between gear ring 19 and planet carrier 17. This arrangement of the selectors gives a low ratio "over drive" for high gear.

For direct drive, dog 40 is moved to engage the splines 13 on gear ring 11. Power is transmitted by the member 31 through this dog to gear ring 11 by way of these splines. Since it has been shown that gear ring 11 rotates faster than the pinion carrier 17 at all times this driving effort will be transmitted through the pawls 12, carried by gear ring 11 to the supporting piece 29 and so to the hub shell. Meanwhile the gears are idling and the other supporting piece 26 will over-run its co-acting pawls 20.

If, however, the turning effort be applied to gear ring 11 by the splines 14, and the pawls 12 disengaged from ratchet teeth 30, as hereinafter described, the pinion carrier 17 will be carried round in the same direction at a reduced speed, such speed being governed by the numbers of teeth in the gear ring 11 and sun pinion 23, and also by the fact that this sun pinion is rotated in the same direction by action of the gear ring 19 (which in this gear is attached to and rotates at the same speed as the planet carrier 17 by virtue of the pawls 20 and ratchet teeth 27) acting on the planet cage 22 by means of the planet pinions 21 which mesh with gear ring 19 and sun pinion 25, which latter is fixed to the axle 24 as previously described. This arrangement of the selectors gives a close ratio low gear.

If now in this latter gear position, the sun pinion 25 is disengaged from the axle and the planet carrier and sun pinion 22 be fixed to the axle, by movement of the dog 51 as above described, the planet carrier 17 and with it the driven member will be carried round in the same direction at a further reduced speed, such speed now being governed by the numbers of teeth in gear ring 11, sun pinion 23, and planet pinions 15 only, the gear train A now being inoperative and the sun pinion 25 revolving idly on the axle.

This arrangement of the selectors gives a second low gear of larger ratio from the normal or fixed ratio.

It will be seen that the ratio between the speeds of the gear ring 11 and the planet carrier 17 is such that in all cases stated, the gear ring 11 rotates in the same direction as the planet carrier 17 but at a greater speed than it, such variation in speed being dependent upon the gear trains in operation. Further, it will be seen that the ratio is such that when the two annuli are coupled, i. e. when the pawls 12 are engaged, the differential effect of the two epicyclic trains is greater than when the annulus 19 is coupled to the planet carrier 17 by the pawls 20, this giving the effect that the overdrive gear ratio is less than the underdrive gear ratio. In the example described the planet pinions 15 are double pinions, but they can be single pinions if required, the double pinions being used to give a particular gear ratio. Alternatively the pinions 21 can be double pinions if this is necessary to give any other required ratio.

To demonstate the low ratio and larger bottom ratio which can be obtained by the improved construction, while using quite ordinary gear wheels, the following details are given.

The gear ring 11 and sun pinions 23 have 56 and 20 teeth respectively while the double planet pinions 15 have 14 and 20 teeth respectively. The gear ring 19, the planets 21, and the sun pinion 25 have 60, 15 and 30 teeth respectively. With such gears top gear provides 7.2% increase over direct drive, first low gear provides 7.65% decrease and second low gear provides 20% decrease. Using usual nomenclature gear ratios would therefore be approximately 80, 92½, 100 and 107¼. The percentage decrease 7½ or increase 7¼ of the close or differential ratios is less than half the percentage decrease 20 of the normal or direct ratio, which in turn is less than the percentage increase of the normal or direct ratio which would be 25.

The action of disengaging the pawls 12 is as follows:

In moving from engagement from the first splines 13 the dog will first move laterally to a position behind the pawls 12 and will then rotate by virtue of the power communicated by the driving member 31 until it engages with the second set of splines 14 which are angularly displaced from the first splines. During this small arc of rotation no power is being transmitted from the driving member 31 to the gear assembly, and so the pawls 12 are not under load. These pawls which have hitherto transmitted the drive to the shell, are formed with chamfered tail pieces 42 (see Fig. 6) which are adapted to be engaged by the sliding dog 40 during this small arc of rotation so as to lift this end of the pawls to disengage the other end of the pawls by depressing them from the ratchet teeth of its coacting supporting piece 29. When such disengagement has been effected the dog 40 engages the second set of splines 14 and through them the drive is applied direct to the gear ring. The relationship of the pawl pivot pins of the pawl 12, the driving splines 14 and the width of the dog 40 is such that when the dog takes up its driving position against the splines 14 the pawls 12 are held out of engagement with the teeth 30 of the supporting piece 29.

It will be further noted that in changing from direct drive to low gear as above described in the event of the driver member 31 being stationary and the hub shell rotating, so over-running both sets of pawls 12 and 20, the drag of the mechanism will cause the sliding dog 40 to take up a position on the non-driving face of the first set of splines 13. To enable the sliding dog 40 to move laterally the chamfer 42 is cut on the pawls of the first set (see Fig. 6) so that the sliding dog will be able by virtue of the wedging action of this chamfer to move axially while elevating the pawls 12 and then drop back to the non-driving face of the second set of splines 14. In taking up the drive again, the sliding dog 40 will elevate the pawls 12 by their rearmost shape before driving on the splines 14 as previously described. The pawls 12 and 20 provide a free wheel action in all the gear ratios.

As shown in Fig. 7 the selector mechanism at the right hand end is the same as shown in my co-pending United States Patent No. 2,168,600, the key 35 being positively secured to the rod 36. In place of the extension rod 54 a further rod 62 is provided, fixed to the key 61, the rod being provided with a spring 63 which abuts against a collar 64 screwed into the axle. The rod is provided with the usual operating chain. The spring 63 is arranged to be stronger than the spring 57 and thus normally would hold the dog 51 in engagement with the dogs 53 on the planet carrier 22, to lock it to the axle 24. By pulling the rod 62 outwards (to the left) the dog 51 releases the part 22 and engages the dogs 50 to lock the pinion 25 to the axle.

With the above construction it will be seen that the selector rod 36 can be operated to provide high, normal (direct) or low, whilst the selector rod 62 decides whether the high or low shall be low ratio or larger ratio according to whether the pinion 25 or the planet carrier and pinion 22, 23 is held stationary, respectively.

Obviously the invention is not limited to the details of the example above described, many of which could be modified without departing from the nature of the invention, the principal features of which are as follows:

1. The sun pinion of the gear train B is geared to alternative members of the gear train B by means of the epicyclic gear train A in such manner that the said sun pinion is driven in the direction of the driving and driven members, so reducing the overdrive or underdrive ratio existing between the driving and driven members of the epicyclic gear train B.

2. The sun pinion of the gear train B is geared to that member of the train B which will reduce the overdrive ratio of the gear train to a greater extent than it reduces the underdrive ratio of the gear train.

3. The sun pinion of the gear train B can be locked separately from the sun pinion of the gear train A so allowing the gear train B to be used alone in the orthodox manner to give an underdrive ratio, and not in conjunction with the secondary gear train, so giving four gear ratios.

4. The driving member can transmit power to the driven member in a ratio of one to one, or give an overdrive ratio and two underdrive ratios, such ratios being adjustable by the numbers of teeth in the gear trains, the first overdrive and underdrive being of lower ratio to the direct one to one gear ratio than that obtainable in an orthodox epicyclic gear unit of similar size, together with a further lower ratio obtained by using one of the gear trains in the orthodox manner.

5. By supplying a separate control to the dog operating between the two epicyclic gear train sun pinions a further gear ratio increase can be obtained being equal to the increase obtained by using the primary train only as in the case of an underdrive ratio as set out in feature 3. This separate control by spring and rod gives a total of five speeds comprising two increases, two decreases, and one direct drive.

6. All rotating parts are so journalled to each other and to the casing of the gear as to be concentric one with another and with the axis of the casing under all conditions and with a minimum of relative movement.

7. The gear ratio can be changed at will by means of movable couplings between the driving and driven members while the gear is in use.

8. All gear trains are journalled on either side of said gear trains to eliminate strains due to overhung loads.

9. The relative speeds of the low ratio gear trains are kept lower than in orthodox epicyclic gears thus increasing life of gears and also the load transmissible for a given size of gear.

One advantage of the construction of the first example of gear above described is that the planet gears of the train A, whilst the fourth and fifth or larger ratio gears were in use, were compelled to rotate at relatively high speeds, and the present invention has for its object an improved construction and arrangement of parts to overcome the said disadvantage.

In a preferred embodiment of the invention incorporating the third feature of the invention and compared with the examples above described, means are provided for uncoupling the planet carrier of the gear train A from the sun pinion of the gear train B when such sun pinion is held stationary.

In such preferred embodiment of the invention, the improved change speed gear is characterised in that the annulus of the gear train A is coupled to the driven members and means are provided (a) for coupling alternatively the planet carrier or annulus of the gear train B to the driven member (b) alternatively for coupling the sun of the train B to the axle for holding it stationary or for causing the sun of the gear train B to rotate with the planet carrier of the gear train A about the stationary sun pinion of the gear train A and (c) for coupling a driving member alternatively to either the planet carrier or annulus of the gear train B.

According to a constructional embodiment of the invention, incorporating this third feature the selector mechanism is arranged so that for a 4-speed gear whilst the sun pinion of the gear train B is constrained to rotate with the planet carrier of the gear train A about the stationary sun pinion of the gear train A and whilst the planet carrier of the gear train B is uncoupled from the driven member (the annulus of the gear train B being coupled to the driven member) the driving member may be coupled alternatively to the annulus of the gear train B for a normal or direct ratio, or to the planet carrier of the gear train B for a low ratio high gear, or whilst the driving member is connected to the annulus of the gear train B, the latter is uncoupled from the driven member (the planet carrier of the gear train B being then coupled to the driven member) for a low ratio low gear, or whilst the driving member is still coupled to the annulus of the train B and the planet carrier of the train B is still coupled to the driven member, the sun of the train B is held stationary whilst the gear train A is permitted to run idle for a fourth or low gear of larger ratio; or, for a fifth and high gear of wider ratio, the selector mechanism is arranged as for the fourth gear ratio but with the driving member connected to the planet carrier of the gear train B and the annulus of the gear train B is connected to the driven member.

In such preferred embodiment of the invention the solitary sun pinion of the gear train A is permanently held stationary and the means for coupling and uncoupling the planet carrier of the gear train A from the sun pinion of the gear train B also embodies means for holding the sun pinion of the gear train B stationary.

Figure 8:
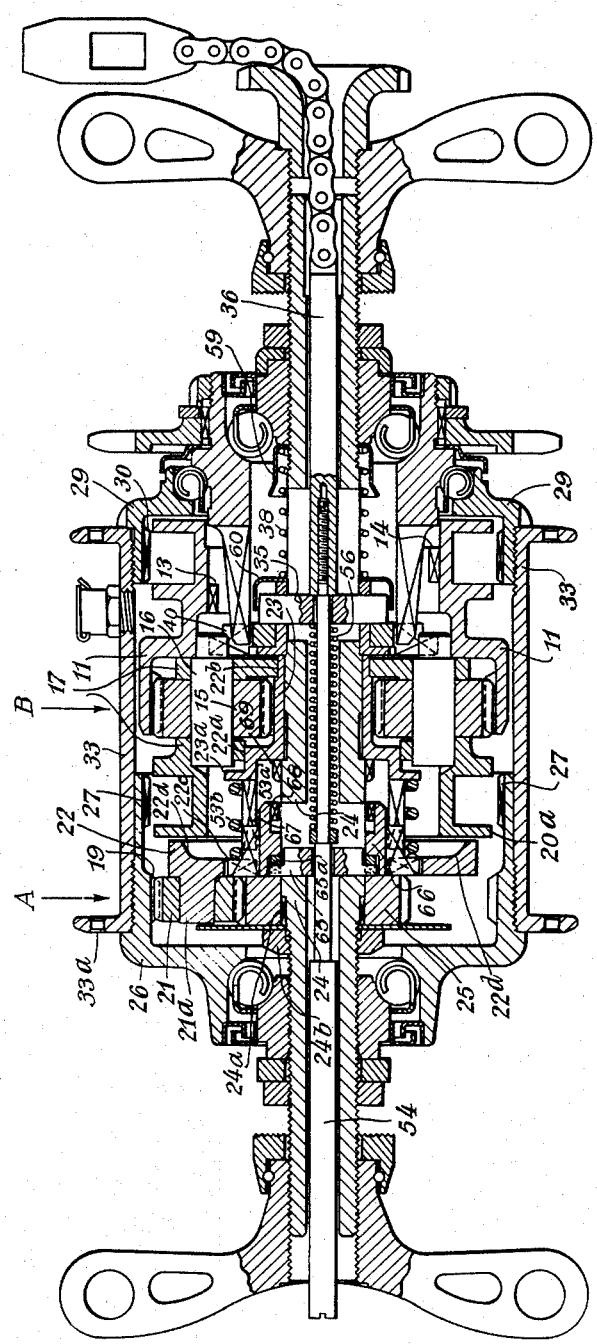
Fig. 8 is a sectional side elevation of a modified construction of a cycle hub epicyclic variable speed gear incorporating the third feature of the invention.

As shown in Fig. 8 the gear has many parts of the same construction as described and illustrated in Fig. 1 and such parts are for simplicity given the same reference numbers.

The following are the principal differences:

1. The sun pinion 25 is permanently secured by splines 24a and a nut 24b to the axle 24, and such sun pinion does not have the dog teeth 50 of the first example.

2. The planet carrier or cage 22 is severed from the sun pinion 23 and the disc-like back part of such cage is formed with a ring of internally cut teeth 22c. The pinion 23 is provided with long dogs 53a equivalent to the dogs 53 of the first example, whilst such dogs 53a extend to within a short distance of the said ring of internally cut teeth 22c of the cage 22. The pinion 23 is formed with a flange 23a which forms an abutment for a spring 53b carried on the dogs 53a and engaging the back face of the dogs 67 described below.

3. In place of the sliding dog 51 there is provided a sliding key 65 mounted in the axle 24 and carrying a rotatable collar 66 also journalled on the axle 24 and formed on its outer periphery with dogs 67 adapted permanently to engage with the long dogs 53a and to be engaged with or disengaged from the ring of internally cut teeth 22c, in the cage 22. Between the collar 66 and the key 65 is a ring 65a notched on its face to engage the ends of the key, the other face of such ring forming a thrust bearing for the collar 66. This rotatable collar 66 also has internally formed dog teeth 68 adapted to engage dogs 69 formed on or permanently secured to the axle 24 immediately against the pinion 23. The sliding key 65 is adapted to be operated by the rod 46 in the same manner as was the sliding dog 51. The sliding parts are kept normally so that the cage 22 is united to the pinion 23 for rotation together by means of the spring 53b above described.

Thus it will be seen that, for the direct and low ratio gear changes the sliding key 65 remains in a position in which the cage 22 is connected to the pinion 23, the selector mechanism operating exactly as described in the first example.

For the fourth or extra low gear position, the rod 36 moves the sliding key 65 so that the dogs 67 of the collar 66 disengage from the internally toothed ring 22c in the cage 22 whilst the internally formed dog teeth 68 on the collar engage the dogs 69 on the axle, so that the cage 22 is thus released whilst the pinion 23 is held stationary as the long dogs 53a are still engaged with the external dogs 67 on the collar 66.

For providing a fifth gear ratio, separate control mechanism would preferably be employed for moving the sliding key 65 and its collar 66 in the same way as described for moving the sliding dog 51 (see Fig. 7) so that whilst the collar 66 was in a position to hold the pinion 23 stationary the other selector 40 could be moved to the position shown in Fig. 3 previously required for the high low ratio gear.

The construction of the present invention shown in Fig. 8 embodies several minor features of construction such as locating the pawls (not shown) of the free wheel mechanism in a groove 20a and extending the cage 22 of the gear train A with an annular flange 22d to locate it against one side of groove for the adjacent pawls. Also, instead of double planet pinions 15, single planet pinions 15a are employed which provide room for the spring 53b which returns the sliding collar 66 but this alteration does not alter the fact that the underdrive gear ratio is greater than the overdrive gear ratio. Thus in one arrangement the following ratios were obtained, approximately:

1st—25% underdrive.
2nd—10% underdrive.
3rd—Direct drive.
4th—9.1% overdrive.
5th—33⅓% overdrive.

The invention is obviously not limited to all the details of construction above described, some of which may be modified without departing from the nature of the invention.

What I claim is:

1. An epicyclic variable speed gear comprising first and second epicyclic gear trains, each consisting of a sun, a planet carrier and an annulus member, a driving member, driving selector means for selectively coupling said driving member alternatively to the planet carrier or annulus of the first gear train for overdrive ratio and either direct drive or underdrive ratio respectively relative to said driving member, a fixed member, a driven member, pawl and ratchet means connecting the planet carrier of the first gear train to the driven member, second pawl and ratchet means connecting the annulus of the first gear train to the driven member, means for tripping the pawl of said second pawl and ratchet means out of engagement with said driven member when the driving selector is coupled to the annulus of the first gear train whereby drive is transmitted to said driven member alternatively through said first or said second pawl and ratchet means from the planet carrier of the first gear train or the annulus of the first gear train, means connecting the sun member of the first gear train to the planet carrier of the second gear train and means for connecting the sun member of the second gear train to said fixed member, characterised in that the annulus of the second gear train is permanently connected to the driven member, whereby the two gear trains may be coupled for overdrive and underdrive ratios, so that relative to the direct ratio, the gear ratio increase is less than the gear ratio decrease.

2. An epicyclic variable speed gear according to claim 1 characterised by means for disconnecting the planet carrier of the second gear train from the sun member of the first gear train so that the second gear train may run idle and for coupling the sun member of the first gear train to the fixed member, so that first gear train may provide additional overdrive and underdrive ratios from the alternative positions of the driving selector means aforesaid.

3. An epicyclic variable speed gear according to claim 1 characterised by means for disconnecting the planet carrier of the second gear train from the sun member of the first gear train so that the second gear train may run idle and for coupling the sun member of the first gear train to the fixed member, so that the first gear train may provide additional overdrive and underdrive ratios from the alternative positions of the driving selector means aforesaid, and further characterised by actuating means for moving the said driving selector between its alternate positions and tripping said pawl and lost motion mechanism coupling said actuating means to the means for uncoupling the planet carrier of the second gear train from the sun member of the first gear train and for coupling the sun member of the first gear train to the fixed member, said driving selector being arrested after reaching its pawl tripping position, further movement of the actuating means causing the uncoupling action aforesaid.

4. An epicyclic variable speed speed gear according to claim 1 characterised by means for disconnecting the planet carrier of the second gear train from the sun member of the first gear train so that the second gear train may run idle and for coupling the sun member of the first gear train to the fixed member, so that the first gear train may provide additional overdrive and underdrive ratios from the alternative positions of the driving selector means aforesaid, further characterised by actuating means for moving the driving selector between its alternative positions and separate actuating means for disconnecting the planet carrier of the second gear train from the sun member of the first gear train so that the second gear train may run idle and for coupling the sun member of the first gear train to the fixed member, so that the first gear train may provide additional overdrive and underdrive ratios from the alternative positions of the driving selector means aforesaid.

5. An epicyclic variable speed gear comprising first and second epicyclic gear trains, each consisting of a sun, a planet carrier and an annulus member, a driving member, driving selector means for selectively coupling said driving member alternatively to the planet carrier or annulus of the first gear train for overdrive ratio and either direct drive or underdrive ratio respectively relative to said driving member, a fixed member, a driven member, pawl and ratchet means connecting the planet carrier of the first gear train to the driven member, second pawl and ratchet means connecting the annulus of the first gear train to the driven member, means for tripping the pawl of said second pawl and ratchet means out of engagement with said driven member when the driving selector is coupled to the annulus of the first gear train whereby drive is transmitted to said driven member alternatively through said first or said second pawl and ratchet means from the planet carrier of the first gear train or the annulus of the first gear train, means connecting the sun member of the first gear train to the planet carrier of the second gear train and means for connecting the sun member of the second gear train to said fixed member, one of said connecting means being disconnectable, characterised in that the annulus of the second gear train is permanently connected to the driven member, whereby the two gear trains may be coupled for overdrive and underdrive ratios, in such manner that relative to the direct ratio, the overdrive ratio is less than the underdrive ratio, further characterised by means for uncoupling the sun member of the second gear train from the fixed member so that the second gear train may run idle and for coupling the sun member of the first gear train to the fixed member so that the first gear train may provide additional overdrive and underdrive ratios from the selective coupling aforesaid of the driving member.

6. An epicyclic variable speed gear according to claim 5 further characterised by actuating means for moving the said driving selector and said pawl tripping means and lost motion means connecting said actuating means to the means for uncoupling and coupling the sun members to and from the fixed member so that while the said driving selector and pawl tripping means are positioned for giving a decrease ratio, said actuating means may be used to effect said uncoupling and coupling of the sun members.

WILLIAM BROWN.

REFERENCES CITED

The following references are of record in the file of this patent:

UNITED STATES PATENTS

| Number | Name | Date |
|---|---|---|
| 1,045,238 | Winkler | Nov. 26, 1912 |
| 2,168,600 | Brown | Aug. 8, 1939 |
| 2,301,852 | Brown | Nov. 10, 1942 |

FOREIGN PATENTS

| Number | Country | Date |
|---|---|---|
| 5,988 | Great Britain | Dec. 11, 1913 |
| 13,728 | Great Britain | June 12, 1912 |
| 221,146 | Switzerland | Aug. 1, 1942 |